(12) United States Patent
Lovens et al.

(10) Patent No.: US 9,400,136 B2
(45) Date of Patent: Jul. 26, 2016

(54) ELECTRIC INDUCTION GAS-SEALED TUNNEL FURNACE

(75) Inventors: Jean Lovens, Embourg (BE); Michel Fontaine, Aywaille (BE)

(73) Assignee: INDUCTOTHERM CORP., Rancocas, NJ (US)

(*) Notice: Subject to any disclaimer, the term of this patent is extended or adjusted under 35 U.S.C. 154(b) by 1006 days.

(21) Appl. No.: 13/114,493

(22) Filed: May 24, 2011

(65) Prior Publication Data

US 2011/0292962 A1 Dec. 1, 2011

Related U.S. Application Data

(60) Provisional application No. 61/348,167, filed on May 25, 2010.

(51) Int. Cl.
| | |
|---|---|
| H05B 6/26 | (2006.01) |
| F27B 9/32 | (2006.01) |
| F27D 7/06 | (2006.01) |
| F27B 9/06 | (2006.01) |
| F27B 9/36 | (2006.01) |
| C21D 9/60 | (2006.01) |
| F27B 9/28 | (2006.01) |
| C21D 9/56 | (2006.01) |

(52) U.S. Cl.
CPC . *F27B 9/067* (2013.01); *C21D 9/60* (2013.01); *F27B 9/28* (2013.01); *F27B 9/36* (2013.01); *C21D 9/565* (2013.01); *Y02P 10/253* (2015.11)

(58) Field of Classification Search
CPC ............ C21D 9/565; C21D 9/60; F27B 9/36; F27B 9/067; F27B 9/28
USPC ......... 373/138, 140, 142, 152, 154, 159, 161, 373/166; 432/23, 209, 233, 247; 219/645–659, 672, 676; 266/129
See application file for complete search history.

(56) References Cited

U.S. PATENT DOCUMENTS

| | | | | | |
|---|---|---|---|---|---|
| 4,787,227 | A | * | 11/1988 | Lievens et al. .................... | 72/38 |
| 5,195,673 | A | | 3/1993 | Irish et al. | |
| 6,422,861 | B1 | * | 7/2002 | Antczak et al. ................. | 432/13 |
| 2007/0125770 | A1 | * | 6/2007 | Hamaguchi ................... | 219/651 |

FOREIGN PATENT DOCUMENTS

| | | | |
|---|---|---|---|
| FR | 2887737 A1 | 12/2006 | |
| JP | 06-185870 | * 7/1994 | ............... F27D 1/00 |
| JP | 8-121969 A | 5/1996 | |
| JP | 2005221132 A | 8/2005 | |
| JP | 2005-336597 A | 12/2005 | |
| JP | 2008-190783 A | 8/2008 | |
| JP | 2008-224058 A | 9/2008 | |
| JP | 2008267704 A | 11/2008 | |
| JP | 2008-308729 A | 12/2008 | |

* cited by examiner

*Primary Examiner* — Dana Ross
*Assistant Examiner* — James Sims, III
(74) *Attorney, Agent, or Firm* — Philip O. Post

(57) ABSTRACT

An electric induction gas-sealed tunnel furnace and process are provided. The exterior of the furnace's enclosure that forms a closed tunnel region is surrounded at least along its longitudinal length by a gas-tight barrier chamber that can be filled with a barrier gas to a different pressure than the pressure of the process gas in the closed tunnel region of the furnace. The inductors used to induction heat strips or plates in the closed tunnel region can be positioned within or outside of the gas-tight barrier chamber around the longitudinal length of the closed tunnel region.

10 Claims, 9 Drawing Sheets

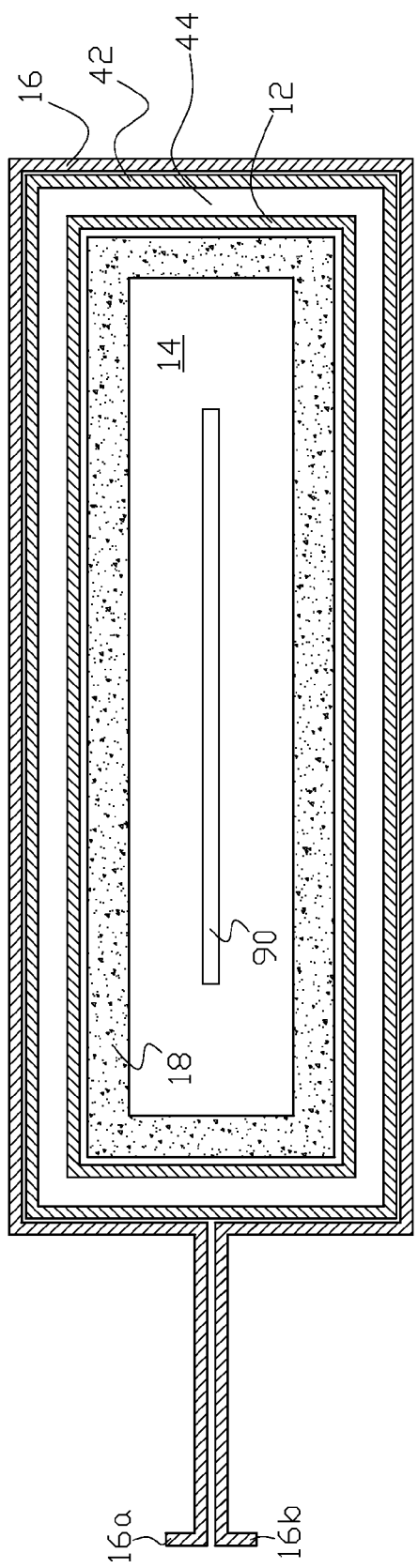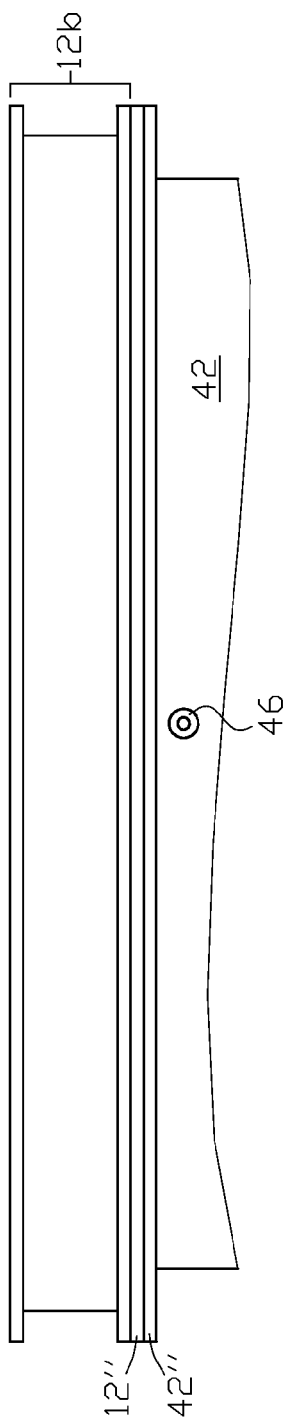
FIG. 4(b)
FIG. 4(c)

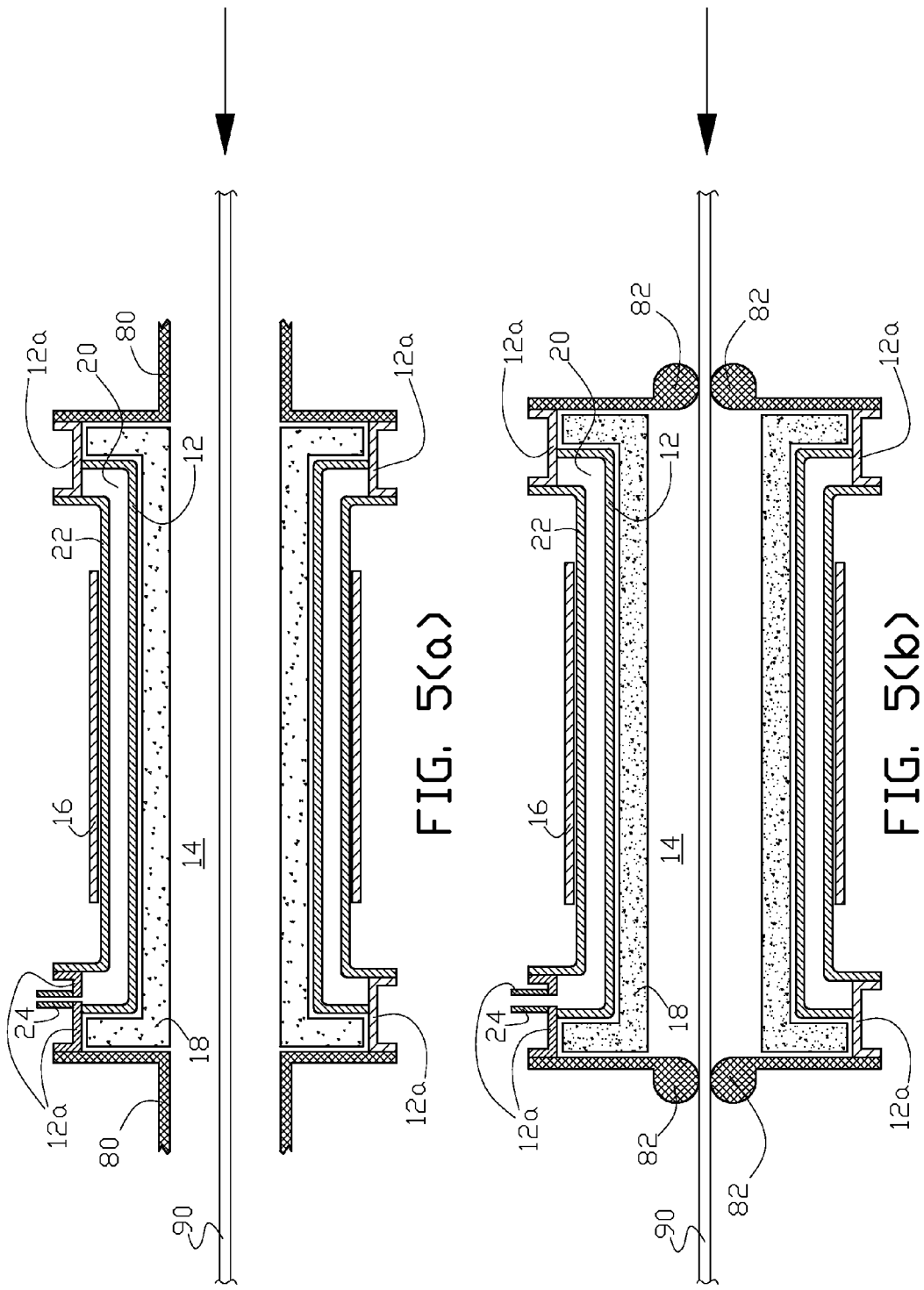

ELECTRIC INDUCTION GAS-SEALED TUNNEL FURNACE

CROSS REFERENCE TO RELATED APPLICATIONS

This application claims the benefit of U.S. Provisional Application No. 61/348,167, filed May 25, 2010, which is hereby incorporated by reference in its entirety.

FIELD OF THE INVENTION

The present invention relates generally to electric induction tunnel furnaces where continuous strips or discrete plates pass through a gas-sealed tunnel to be inductively heated, and in particular to such furnaces when used in processes where protection against leakage of the process gas from the tunnel to atmosphere must be accommodated.

BACKGROUND OF THE INVENTION

There are industrial processes where electric induction heating of a continuous strip must be accomplished in a gas-tight tunnel furnace. For example as shown in longitudinal cross section in FIG. 1, strip 90 passes through electric induction gas-sealed tunnel furnace 110. Furnace enclosure 112 is made sufficiently gas-tight around the tunnel 114 through which strip 90 passes. Electric induction coil 116 (or coils) can be placed outside of enclosure 112 if the enclosure is sufficiently transparent to the magnetic flux field that is generated by alternating current flowing through coil 116 and allows the field to penetrate inside of the enclosure so that the field can magnetically couple with the strip in the tunnel. Thermal insulation 118 can be utilized, for example, between the interior of the tunnel and enclosure 112. The flux field heats the strip by electromagnetically coupling with the strip to induce eddy currents in the strip. The strip is heated to perform an industrial process, for example, if the strip is coated with a liquid composition before entry into the tunnel, inductive heating of the strip will cause the liquid composition to bond (or cure) to the strip by evaporation of solvents in the liquid composition.

In some industrial processes the inductive heating in the furnace must be accomplished in a process gas environment that could be problematic if the tunnel gas is released into the open air (atmosphere) around the outside of the furnace for reasons such as pollution, explosive or combustive reaction with air, high cost of the process gas, or strict low tolerance to deviations in the composition of the process gas. For example the process gas in the tunnel for decarburization of steel comprises a high concentration hydrogen gas. Although enclosure 112 may be called a "gas-tight" enclosure, the enclosure is subject to leakage since, practically, the enclosure can not be constructed as a single continuous enclosure without the cost being prohibitive. Therefore there are, for example, joints between materials making up the enclosure that may be sufficiently gas-tight during initial fabrication of the enclosure, but may leak after the furnace is put into operation, for example, as a result of repeated heating and cooling of the materials around the joint. Also the enclosure composition and thermal insulation themselves may be gas permeable and serve as passages for gas leaks from the tunnel. One method of handling tunnel gas leaks is to allow the leaking tunnel gas to escape into a well ventilated atmosphere. For example forced ventilation box 180 can be placed around the exterior of furnace 110. Top openings 180a in the ventilation box provide a directed release of gas from the ventilation box when fan 182 forces surrounding external air through the ventilation box. However such method lacks a precise means of insuring that dangerous concentrations of process gas do not build up in the atmosphere exterior to the furnace.

It is one object of the present invention to provide an electric induction gas-sealed tunnel furnace that will assist in preventing the release of a process gas from an electric induction gas-sealed tunnel furnace.

BRIEF SUMMARY OF THE INVENTION

In one aspect the present invention is an apparatus for, and method of, performing an electric induction heating process on a continuous strip or discrete plates passing through a substantially gas-tight tunnel furnace where the tunnel is formed by an enclosure extending along the longitudinal length of the furnace from the strip entry end, to the strip exit end of the furnace. A barrier chamber or plenum is formed around the longitudinal length of the exterior of the enclosure. A barrier gas can be injected into the barrier chamber and maintained at a pressure different from the pressure of the process gas in the tunnel. The inductors used in the induction heating process may be located outside of the barrier chamber or within the barrier chamber.

In another aspect the present invention is an electric induction gas-sealed tunnel furnace. A furnace enclosure forms a closed tunnel region along the longitudinal length of the furnace enclosure through which a workpiece passes through for induced heating. The closed tunnel region of the furnace enclosure has a workpiece entry end and a workpiece exit end. A furnace enclosure entry end flange is located at the workpiece entry end, and a furnace enclosure exit end flange is located at the workpiece exit end. An induction coil is disposed around the longitudinal length of the closed tunnel region of the furnace enclosure. A barrier material forms a gas-tight barrier chamber around the exterior of the longitudinal length of the furnace enclosure, with the barrier material having a sealed entry end interface with the furnace enclosure entry end flange and a sealed exit end interface with the furnace enclosure exit end flange.

In another aspect the present invention is a method of preventing a process gas leak from an electric induction gas-sealed furnace that has a furnace enclosure forming a closed tunnel region along the longitudinal length of the furnace enclosure through which a workpiece passes through for induced heating while the process gas is contained at least within the closed tunnel region. The closed tunnel region of the furnace enclosure has a workpiece entry end and a workpiece exit end. An entry end flange is located at the workpiece entry end of the furnace enclosure, and an exit end flange is located at the workpiece exit end of the furnace enclosure, with an induction coil disposed around the longitudinal length of the furnace enclosure. A barrier material is provided around the exterior of the longitudinal length of the furnace enclosure, and a gas-tight chamber is formed around the exterior of the longitudinal length of the furnace enclosure by sealing an entry end interface between the barrier material and the furnace enclosure entry end flange, and sealing an exit end interface between the barrier material and the furnace enclosure exit end flange.

In another aspect the present invention is a method of electric induction heat treatment of a workpiece in a process gas within a closed tunnel region formed within the longitudinal length of a furnace enclosure. The workpiece is fed through an entry end flange at a workpiece entry end of the closed tunnel region, with the entry end flange forming a sealed entry end interface with a barrier material located exterior to the furnace enclosure. An alternating current is supplied to an induction coil disposed around the longitudinal length of the furnace enclosure to inductively heat the workpiece in the closed tunnel region. The workpiece is withdrawn from the closed tunnel region through an exit end flange at a workpiece exit end of the closed tunnel region, with the exit end flange forming a sealed exit end interface with the barrier material, thereby forming a gas-tight barrier chamber around the exterior of the longitudinal length of the furnace enclosure into which chamber a barrier gas is supplied.

The above and other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 4(b) is a transverse cross sectional view of the electric induction gas-sealed tunnel furnace of the present invention shown in FIG. 4(a) through line C-C.

FIG. 4(c) is a partial top elevation view of the electric induction gas-sealed tunnel furnace of the present invention shown in FIG. 4(a) through line F-F.

FIG. 5(a) and FIG. 5(b) illustrate alternate ways of gas-sealing the workpiece entry and exit ends of an electric induction gas-sealed tunnel furnace of the present invention.

DETAILED DESCRIPTION OF THE INVENTION

Figure 2A:
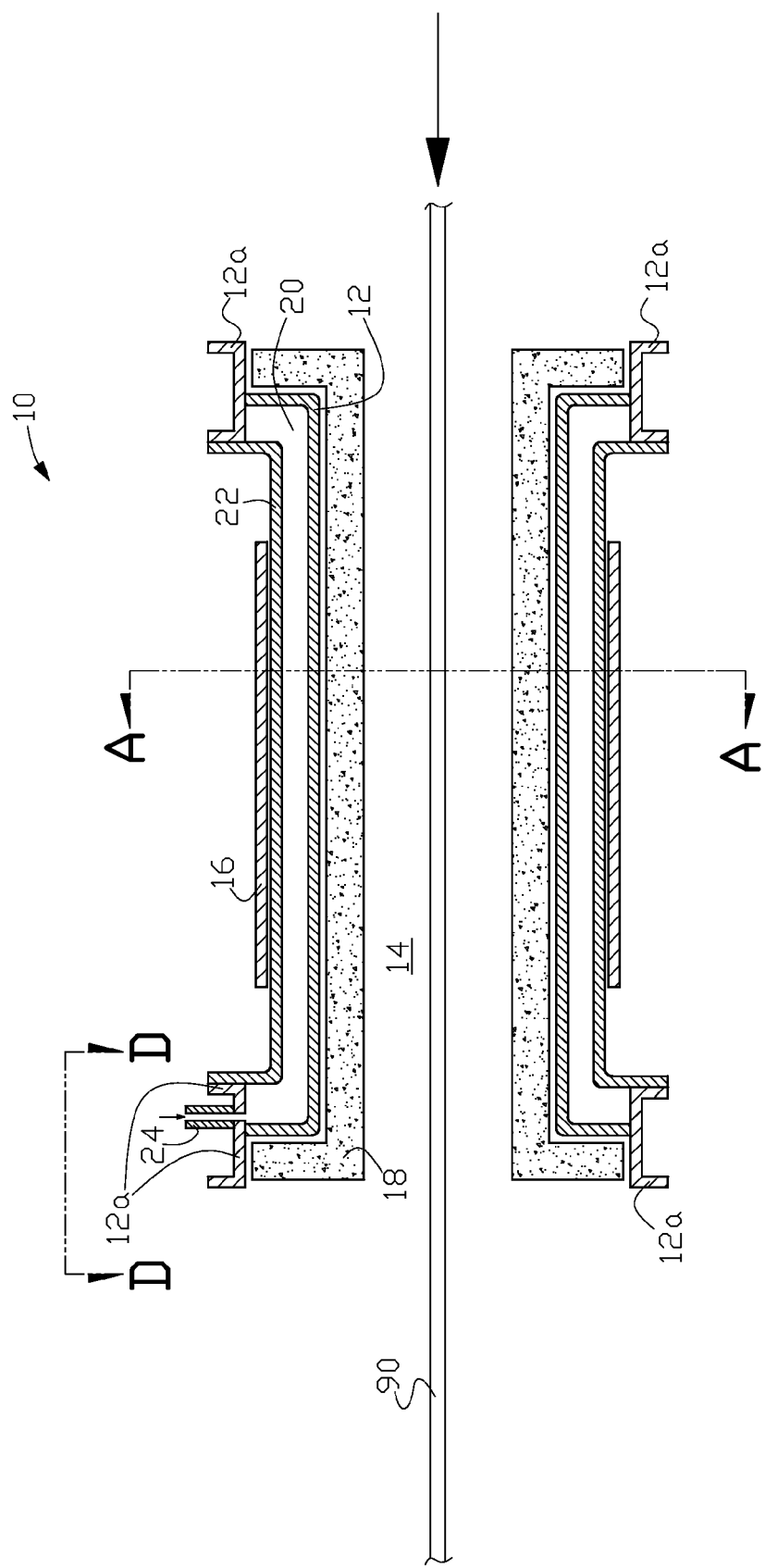
FIG. 2(a) is a longitudinal cross sectional view of one example of an electric induction gas-sealed tunnel furnace of the present invention.
Figure 2B:
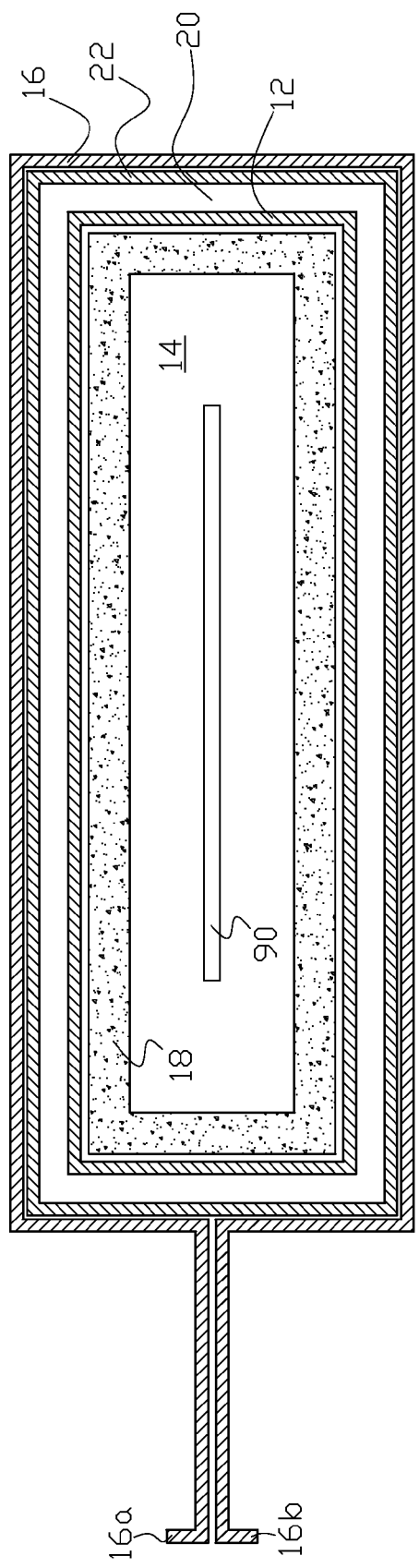
FIG. 2(b) is a transverse cross sectional view of the electric induction gas-sealed tunnel furnace of the present invention shown in FIG. 2(a) through line A-A.
Figure 2C:
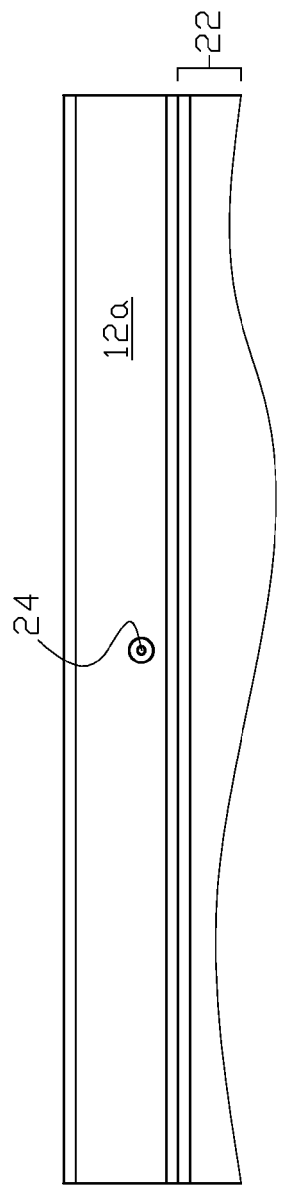
FIG. 2(c) is a partial top elevation view of the electric induction gas-sealed tunnel furnace of the present invention shown in FIG. 2(a) through line D-D.

In the drawings the same reference number or letter is used to describe similar elements as further described herein. FIG. 2(a), FIG. 2(b) and FIG. 2(c) illustrate one example of an electric induction gas-sealed tunnel furnace 10 of the present invention. In this example barrier chamber 20 is formed around the outer longitudinal surface of enclosure 12 by joining barrier material 22 to suitable longitudinal end structural elements of enclosure 12. In this non-limiting example the end structural elements are "U" shaped entry and exit end flanges 12a that are suitably connected to each longitudinal end of furnace enclosure 12, for example, by welding or bolted connections. Similar connecting means can be used to join barrier material 22 to flanges 12a. At least at one location, as shown, for example, in the longitudinal cross section in FIG. 2(a) and in the partial top view in FIG. 2(c), inlet conduit 24 is provided for supply of the barrier gas to the barrier chamber. The term "longitudinal" as used herein is the length of the furnace's enclosure from strip entry end (adjacent to the arrow in FIG. 2(a)) to strip exit end. Therefore barrier chamber 20 forms a "wrap around" substantially gas-tight chamber exterior to furnace enclosure 12 for the length of the furnace from strip entry end to strip exit end. In other words, enclosure 12 forms an interior longitudinal "sleeve" around the transverse of the tunnel and barrier material 22 forms an exterior longitudinal second "sleeve" around the transverse of the closed tunnel region, where the term "transverse" as used herein refers to tunnel cross sections substantially perpendicular to the length of the strip moving through the tunnel. Consequently gas-tight barrier chamber is bounded by the exterior of furnace enclosure 12; interior of the barrier material 22; and the two longitudinal exit and entry end flanges 12a of the enclosure 12. Flanges 12a can be considered an integral part of enclosure 12 in the present invention, and represent one non-limiting method of terminating the longitudinal ends of the enclosure. Flange 12a at one longitudinal end of the furnace can extend completely around the perimeter of the tunnel workpiece entry and/or exit.

One or more inductors 16 (induction coils) can be located exterior to enclosure 12 and barrier material 22, if the enclosure and barrier material are formed from an electromagnetically transparent material such as siliconized or teflonized glass fabric, for example in a sheet form. As in the prior art, thermal insulation 18 can be provided in all examples of the invention. As shown in FIG. 2(b) the single turn solenoidal inductor used in the example can be connected to an external alternating current power source (via inductor load matching components if used) at terminals 16a and 16b.

Although a single turn solenoidal inductor is shown in the figures, for all examples of the invention, the inductor may be one or more inductors that may be connected in any electrical configuration, for example, in series and/or parallel, and may be of any suitable type for a particular application, such as a solenoidal or transverse flux inductor.

A barrier gas, for example an inert gas such as nitrogen, can be injected into barrier chamber 20 via inlet conduit 24 to a positive barrier gas pressure that is greater than the pressure of a process gas in gas-tight tunnel 14 during strip processing in the tunnel. One or more outlet conduits (not shown in the drawings) can be provided to withdraw barrier gas from the barrier chamber.

Gas-tightness at the entry and exit to the tunnel of the furnace in all examples of the present invention can be achieved either by interconnection to other components in the strip industrial process as shown in FIG. 5(a), or by making the entry and exits ends of the furnace sufficiently gas-tight as shown in FIG. 5(b). In FIG. 5(a) the immediate interconnecting entry and exit gas-tight components may be stainless steel flanges 80, and upstream or downstream components connected to the stainless steel flanges can handle supply and return of the process gas to and from the tunnel of the furnace. In FIG. 5(b) the transverse entry and exit ends of the enclosure of the furnace can be made gas-tight, for example, by use of pressure rollers 82 or pressure pads that exert sealing pressure on both sides of the strip.

Figure 3A:
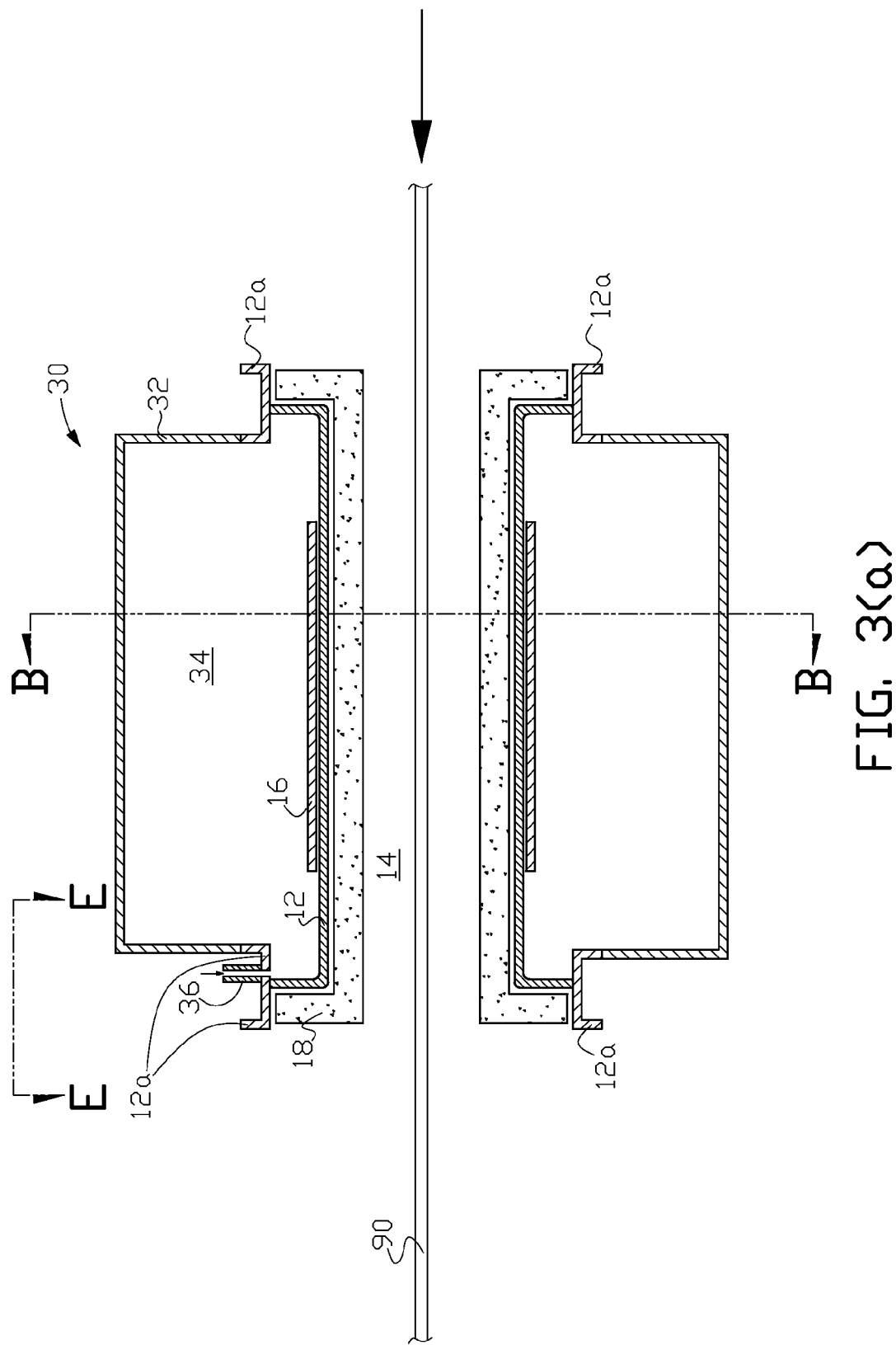
FIG. 3(a) is a cross sectional view of another example of an electric induction gas-sealed tunnel furnace of the present invention.
Figure 3B:
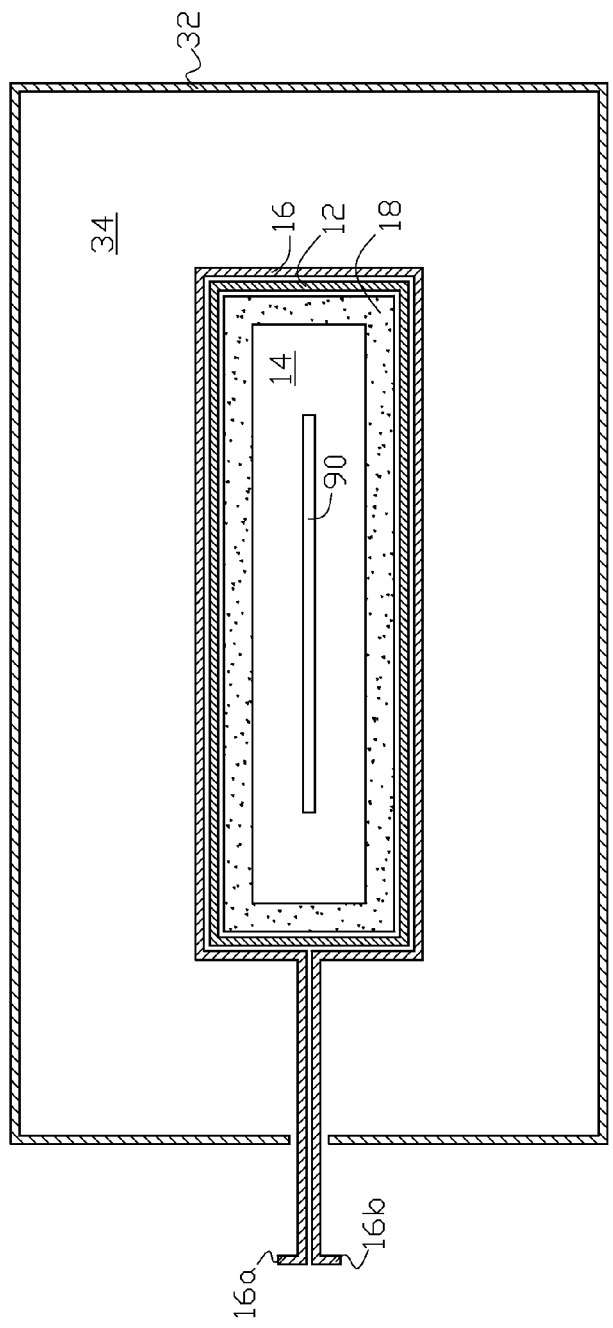
FIG. 3(b) is a transverse cross sectional view of the electric induction gas-sealed tunnel furnace of the present invention shown in FIG. 3(a) through line B-B.
Figure 3C:
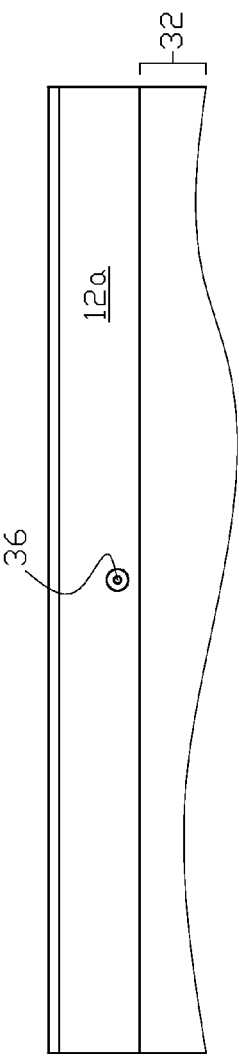
FIG. 3(c) is a partial top elevation view of the electric induction gas-sealed tunnel furnace of the present invention shown in FIG. 3(a) through line E-E.

FIG. 3(a), FIG. 3(b) and FIG. 3(c) illustrate another example of an electric induction gas-sealed tunnel furnace 30 of the present invention. In this example the barrier chamber is an enlarged barrier plenum 34 formed around the outer longitudinal surface of furnace enclosure 12 by joining barrier material 32 to suitable longitudinal end structural elements of enclosure 12. In this non-limiting example the end structural elements are "U" shaped entry and exit end flanges 12*a* that are suitably connected to each longitudinal end of the enclosure, for example, by welding or bolted connections. Similar connecting means can be used to join barrier material 32 to flanges 12*a*. At least at one location, as shown, for example, in the longitudinal cross section in FIG. 3(*a*) and in partial top view in FIG. 3(*c*), inlet conduit 36 is provided for supply of the barrier gas to the barrier chamber. Therefore barrier plenum 34 forms a "wrap around" substantially gas-tight chamber exterior to furnace enclosure 12 for the length of the furnace from strip entry end, to strip exit end similar to that for the above example in FIG. 2(*a*) except that in the present example of FIG. 3(*a*) inductor 16 is contained within the barrier plenum. Barrier plenum 34 is at least sufficiently large to contain the one or more inductors 16 (and fluid cooling elements if used) in the barrier plenum, as opposed to being exterior to the barrier plenum, for example in FIG. 2(*a*). With this arrangement gas-tight electrical (and fluid cooling if used) fittings must be used for connection to an inductor external electric power source (and cooling source if used). As with the example of the invention in FIG. 2(*a*), end flanges 12*a* can be considered an integral part of enclosure 12 in the present invention, and represent one non-limiting method of terminating the longitudinal ends of the enclosure. Alternatively flanges 12*a* may be considered an integral part of barrier material 32.

A barrier gas, for example an inert gas such as nitrogen, can be injected into barrier plenum 34 via inlet conduit 36 to a positive barrier gas pressure that is greater than the pressure of a process gas in gas-tight tunnel 14 during strip processing in the tunnel. One or more outlet conduits (not shown in the drawings) can be provided to withdraw barrier gas from the barrier chamber.

If barrier material 32 is an electrically conductive material, barrier plenum 34 is sufficiently sized so that the barrier material does not interfere with the path of the magnetic flux field that is generated when alternating current flows through inductor 16. If the barrier material is formed from a non-electrically conductive material, the barrier plenum may be smaller; however, an electromagnetic shield may be required around the smaller non-electrically conductive material.

Figure 4A:
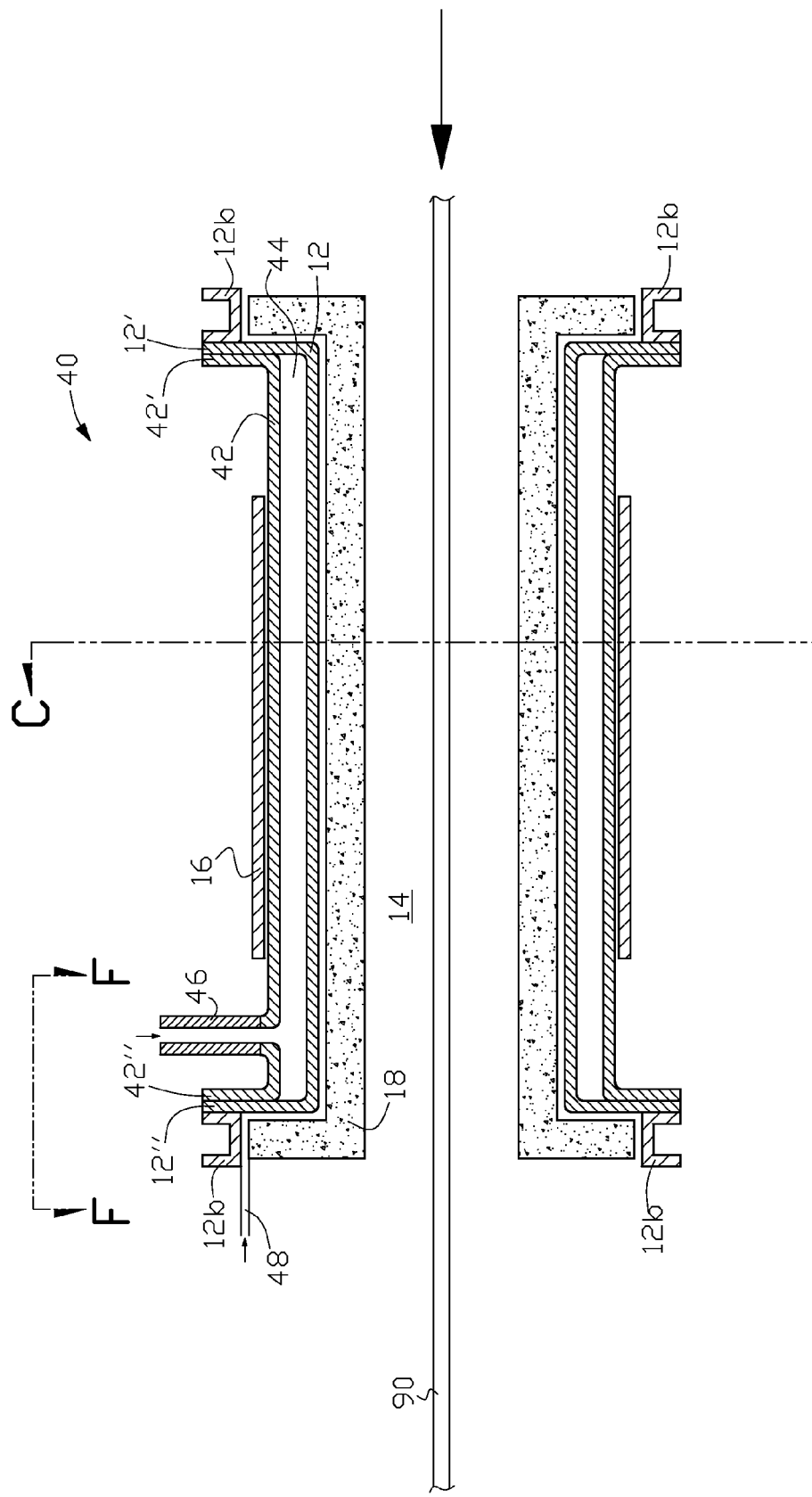
FIG. 4(a) is a cross sectional view of another example of an electric induction gas-sealed tunnel furnace of the present invention.

FIG. 4(*a*), FIG. 4(*b*) and FIG. 4(*c*) illustrate another example of an electric induction gas-sealed tunnel furnace 40 of the present invention. In this example barrier chamber 44 is formed around the outer longitudinal surface of furnace enclosure 12 by joining ends 12' and 12" of furnace enclosure 12 between enclosure entry and exit end flanges 12*b* and ends 42' and 42" of barrier material 42 together as shown in FIG. 4(*a*). Barrier material ends, enclosure ends, and enclosure flanges may be jointed together by suitable means, such as nut and bolt fasteners. At least at one location, as shown, for example, in the longitudinal cross section in FIG. 4(*a*) and in partial top view in FIG. 4(*c*), inlet conduit 46 is provided in barrier material 42 for supply of the barrier gas to the barrier chamber. Consequently gas-tight barrier chamber 44 is bounded by the exterior of furnace enclosure 12 and the interior of the barrier material 42. End flanges 12*b* can be considered an integral part of furnace enclosure 12 in the present invention, and represent one non-limiting method of terminating the longitudinal ends of the enclosure.

A barrier gas, for example an inert gas such as nitrogen, can be injected into barrier chamber 44 via inlet conduit 46 to a positive barrier gas pressure that is greater than the pressure of a process gas in gas-tight tunnel 14 during strip processing in the tunnel. One or more outlet conduits (not shown in the drawings) can be provided to withdraw barrier gas from the barrier chamber.

Supplemental barrier gas can be optionally injected into furnace regions exterior to the barrier chamber depending on the particular arrangement of the barrier chamber. For example in FIG. 4(*a*), thermal insulation 18 is typically a gas porous material. Consequently process gas in tunnel 14 may leak through insulation 18, and then through the connected joint between end flange 12*b* and furnace enclosure 12 at enclosure end 12" as shown in FIG. 4(*a*). Since this joint would leak to atmosphere and not to the barrier chamber for the particular arrangement shown in FIG. 4(*a*), barrier gas may be injected into conduit 48 to flood the joint region with the barrier gas.

Figure 6:
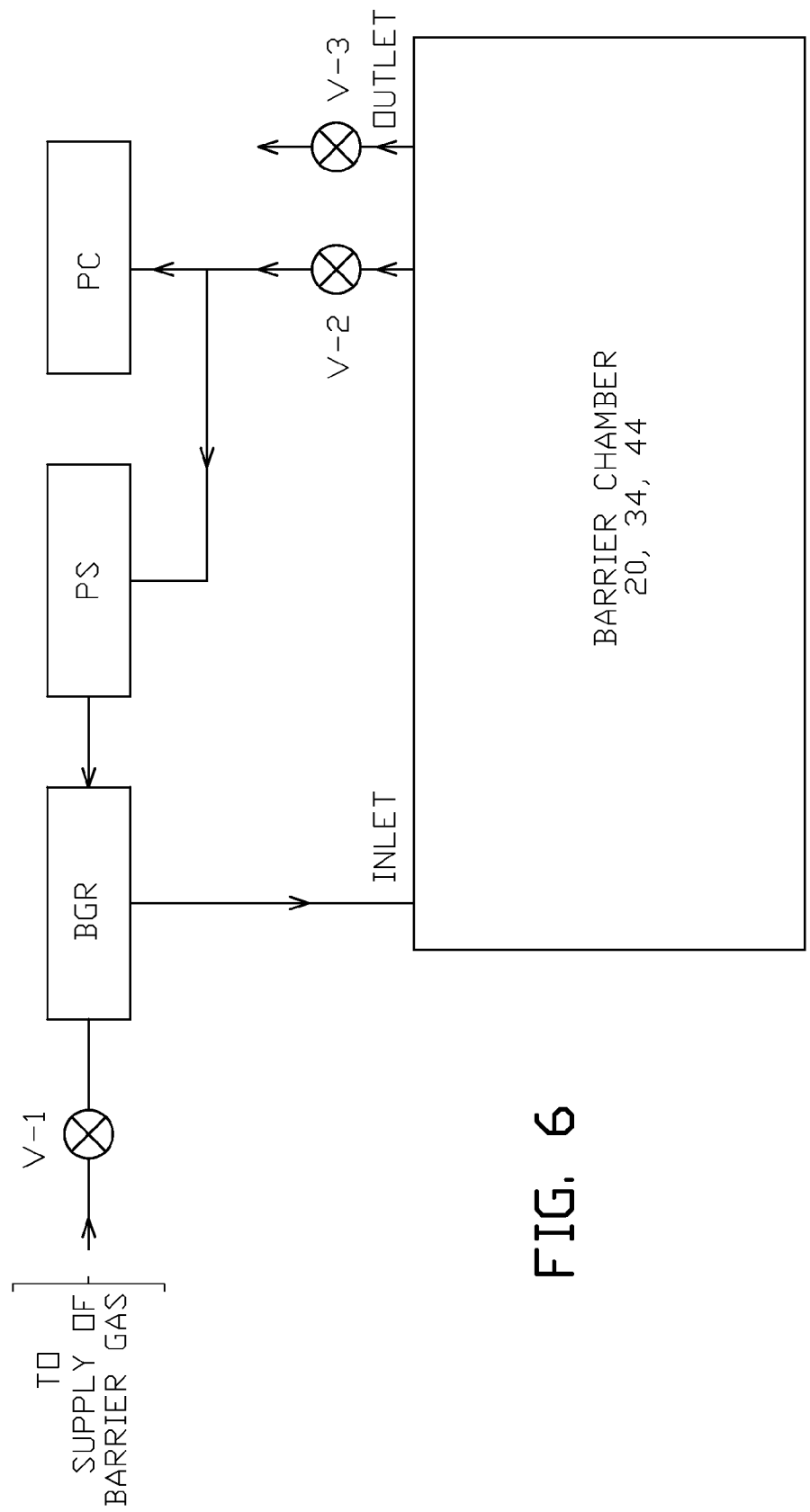
FIG. 6 is one example of a barrier gas control system used with an electric induction gas-sealed tunnel furnace of the present invention.

FIG. 6 is one example of a simplified barrier gas control system that can be used with some examples of the invention. Valve V-1 controls barrier gas supply to barrier gas regulator BGR, which regulates the flow of gas to the barrier chamber (20, 34 or 44 in the above examples of the invention) via INLET (conduit 24, 36 or 46 in the above examples) at a nominal barrier gas pressure, which is at a higher positive pressure than the pressure of the process gas in the tunnel in this example. Pressure sensor PS senses the actual pressure of the barrier gas in the barrier chamber (or the differential pressure between the gas in the barrier chamber and the process gas in the tunnel) and feeds the sensed pressure data back to the barrier gas regulator BGR. Pressure controller PC also senses the actual pressure of the barrier gas in the barrier chamber (or the differential pressure between the gas in the barrier chamber and the process gas in the tunnel). If the barrier gas pressure goes beyond the set high-low pressure band of the pressure controller, the controller outputs a fault signal that can be used, for example, to initiate a flush of the process gas in the tunnel by other equipment in the process line. Valve V-2 is an optional control valve for gas supplies to the pressure sensor and pressure controller. Valve V-3 can be provided at an optional gas outlet from the barrier chamber, for example, to cool down the barrier gas chamber by a continuous flow (or recirculation) of barrier gas through the chamber, or to flush process gas leaking into the barrier chamber from the tunnel. Valve V-3 may be connected to barrier gas processing equipment not shown in the drawing.

One example of an application of an electric induction gas-sealed tunnel furnace of the present invention is for the decarburization of strip steel. The process gas contained in the tunnel comprises a high percentage of hydrogen gas that would burn or explode in air. Therefore the process gas in the tunnel must be maintained at a pressure greater than the atmospheric pressure surrounding the furnace to avoid air penetration into the tunnel. The inert barrier gas selected for this example is standard industrial grade nitrogen that is injected into the barrier chamber of the furnace to a pressure greater than the process gas pressure so that any leak between the enclosure of the furnace and the barrier chamber will cause the flow of nitrogen into the tunnel, rather than the flow of process gas into the barrier chamber.

As an alternative to being an inert gas, the barrier gas may be acceptably reactive with the process gas in tunnel. That is the chemical reaction between a non-inert barrier gas and the process gas does not result in combustion, explosion or other hazardous condition.

In all examples of the invention, the barrier gas supplied to the barrier chamber may be either a re-circulating gas or a non-re-circulating gas. Re-circulating gas may be used, for example, to capture and process leaking process gas from the tunnel in the event that the positive pressure differential between the barrier gas in the barrier chamber and the process gas in the tunnel is lost, or if it is necessary to cool down the barrier chamber, or regions adjacent to the barrier chamber, by a continuous flow of barrier gas through the barrier chamber.

In all examples of the invention location of the barrier gas inlet to the barrier chamber or plenum may be located in other convenient locations as required for a particular application.

Although one barrier chamber is shown in the examples of the invention, multiple barrier chambers may be used in other examples of the invention depending upon a particular application.

Although in the above examples of the invention the pressure of the barrier gas in the barrier chamber or plenum is greater than the process gas in the tunnel, in other applications the pressure differential my be reversed with the barrier gas in the barrier chamber or plenum being at a lower pressure than the process gas in the tunnel.

Figure 1:
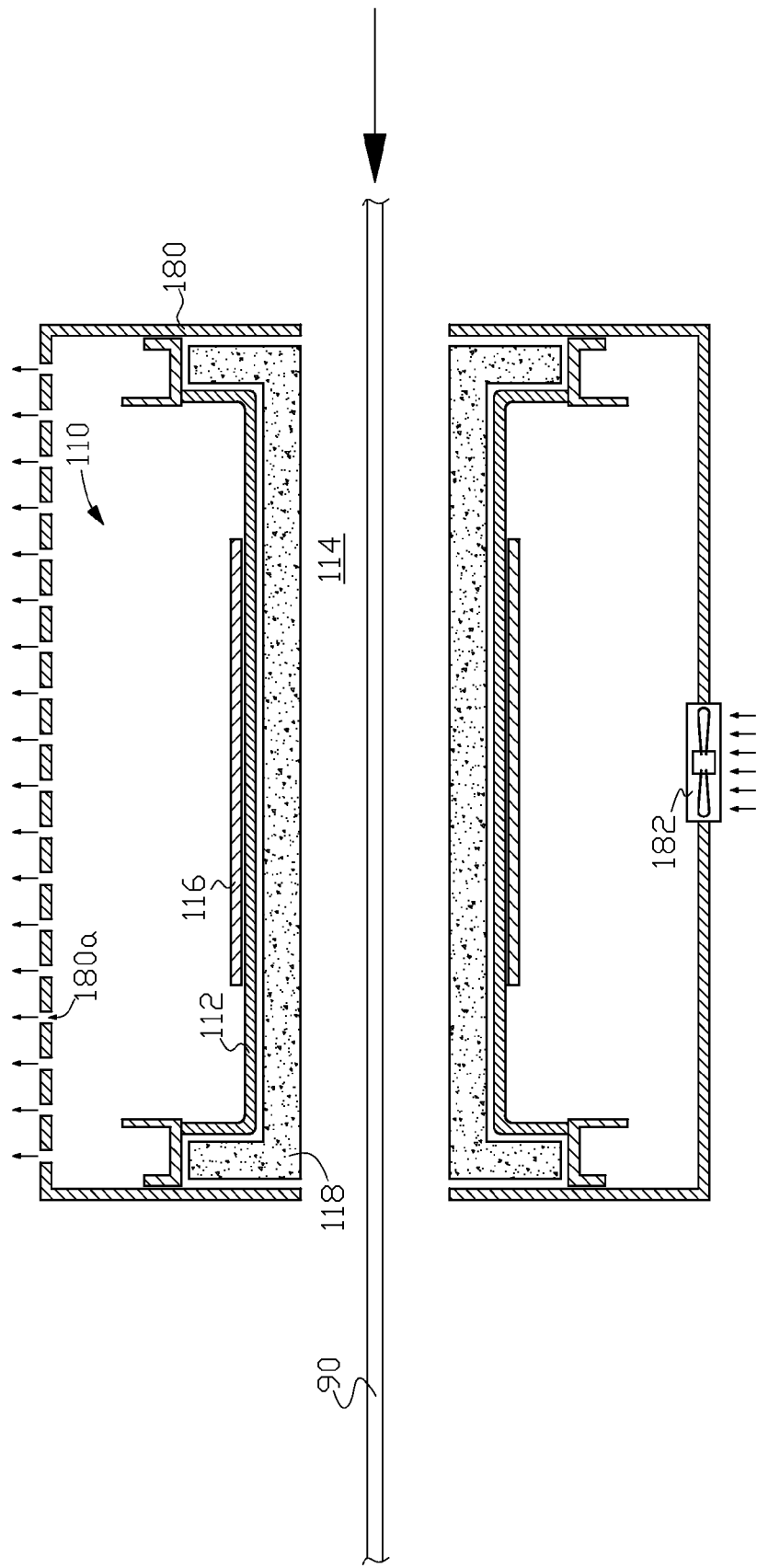
FIG. 1 is a cross sectional view of a prior art electric induction gas-sealed tunnel furnace.

In all examples of the invention, the forced air ventilation box shown in FIG. 1 may be used in combination with an electric induction gas-sealed tunnel furnace of the present invention as an additional feature.

While the present invention is intended to minimize the possibility of a hazardous condition, caution must always be used when operating industrial apparatus regardless of the design. Natural and forced ventilation to atmosphere are typical, but not the only precautionary measures.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. An electric induction gas-sealed tunnel furnace comprising:
   a furnace enclosure forming a closed tunnel region along a longitudinal length of the furnace enclosure through which a workpiece passes through for induced heating, the closed tunnel region of the furnace enclosure having a workpiece entry end and a workpiece exit end;
   a furnace enclosure entry end flange located at the workpiece entry end and a furnace enclosure exit end flange located at the workpiece exit end;
   an induction coil disposed around the longitudinal length of the closed tunnel region of the furnace enclosure;
   an improvement comprising:
   a barrier material forming a gas-tight barrier chamber around an exterior of the longitudinal length of the furnace enclosure, the barrier material having a sealed entry end interface with the furnace enclosure entry end flange and a sealed exit end interface with the furnace enclosure exit end flange, the sealed entry end interface with the furnace enclosure entry end flange being formed by extending a first furnace enclosure end between a first barrier material end and the furnace enclosure entry end flange, the first furnace enclosure end between the first barrier material end and the furnace enclosure entry end flange forming a furnace enclosure-entry end flange sealed interface; and the sealed exit end interface with the furnace enclosure exit end flange being formed by extending a second furnace enclosure end between a second barrier material end and the furnace enclosure exit end flange, the second furnace enclosure end between the second barrier material end and the furnace enclosure exit end flange forming a furnace enclosure-exit end flange sealed interface.

2. The electric induction gas-sealed tunnel furnace of claim 1 further comprising a barrier gas inlet conduit disposed within the barrier material to form a barrier gas entry passage into the gas-tight barrier chamber.

3. The electric induction gas-sealed tunnel furnace of claim 2 further comprising a barrier gas outlet conduit forming a barrier gas exit passage from the gas-tight barrier chamber.

4. The electric induction gas-sealed tunnel furnace of claim 1 further comprising:
   a thermal insulation disposed within the closed tunnel region in the vicinity of the furnace enclosure along the longitudinal length of the furnace enclosure; and
   a barrier gas injector for injecting a barrier gas within a first region between the thermal insulation and the furnace enclosure-entry end flange sealed interface or a second region between the thermal insulation and the furnace enclosure-exit end flange sealed interface.

5. An electric induction gas-sealed tunnel furnace comprising:
   a furnace enclosure forming a closed tunnel region along a longitudinal length of the furnace enclosure through which a workpiece passes through for induced heating, the closed tunnel region of the furnace enclosure having a workpiece entry end and a workpiece exit end;
   a furnace enclosure entry end flange located at the workpiece entry end and a furnace enclosure exit end flange located at the workpiece exit end;
   an induction coil disposed around the longitudinal length of the closed tunnel region of the furnace enclosure;
   a barrier material forming a gas-tight barrier chamber around an exterior of the longitudinal length of the furnace enclosure, the barrier material having a sealed entry end interface with the furnace enclosure entry end flange and a sealed exit end interface with the furnace enclosure exit end flange;
   a barrier gas inlet conduit disposed within the furnace enclosure entry or exit end flange, the barrier gas inlet conduit forming a barrier gas entry passage into the gas-tight barrier chamber;
   a gas regulator having a regulated gas output and a regulated gas input, the regulated gas output connected to the barrier gas inlet conduit;
   a supply of a barrier gas connected to the regulated gas input; and
   a pressure sensor providing a feedback pressure signal to the gas regulator to regulate the supply of the barrier gas to the regulated gas output.

6. The electric induction gas-sealed tunnel furnace of claim 5 wherein the induction coil is disposed exterior to the barrier material.

7. The electric induction gas-sealed tunnel furnace of claim 5 further comprising a barrier gas outlet conduit forming a barrier gas exit passage from the gas-tight barrier chamber.

8. The electric induction gas-sealed tunnel furnace of claim 5 further comprising an interconnecting entry gas-tight component forming an entry gas-tight connection with the furnace enclosure entry end flange and an interconnecting exit gas-tight component forming an exit gas-tight connection with the furnace enclosure exit end flange.

9. The electric induction gas-sealed tunnel furnace of claim 5 wherein the induction coil is disposed within the gas-tight barrier chamber.

10. The electric induction gas-sealed tunnel furnace of claim 5 wherein the feedback pressure signal is a differential pressure between a barrier gas pressure in the gas-tight barrier chamber and a process gas pressure in the closed tunnel region, the electric induction gas-sealed tunnel furnace further comprising a pressure controller having an output fault signal to control flushing of the process gas from the closed tunnel region.

* * * * *